United States Patent [19]

Marutani et al.

[11] Patent Number: 5,650,475
[45] Date of Patent: Jul. 22, 1997

[54] LOW SOLVENT CONTENT TYPE-RESIN COMPOSITION, COATING COMPOSITION CONTAINING SUCH RESIN COMPOSITION AND PROCESS FOR COATING SUCH COATING COMPOSITION

[75] Inventors: Yoshiaki Marutani; Tadamitsu Nakahama; Takashi Tomita; Hiroyuki Uemura; Kazuhi Koga; Mika Ohsawa, all of Hiroshima; Goro Iwamura, Sakai, all of Japan

[73] Assignee: Mazda Motor Corporation, Hiroshima-Ken, Japan

[21] Appl. No.: 508,427

[22] Filed: Jul. 31, 1995

[30] Foreign Application Priority Data

Aug. 2, 1994 [JP] Japan .................... 6-181426

[51] Int. Cl.$^6$ .................... C08G 77/04
[52] U.S. Cl. .................... 528/26; 528/27; 525/209; 525/208; 525/207; 526/273; 526/271; 526/279; 524/806; 524/808
[58] Field of Search .................... 528/26, 25, 27; 526/279, 273, 271; 525/209, 208, 205

[56] References Cited

U.S. PATENT DOCUMENTS 5,281,636  1/1994  Nambu et al. .................... 525/209
5,359,005  10/1994 Kania et al. .................... 525/203

*Primary Examiner*—Ralph H. Dean
*Attorney, Agent, or Firm*—Keck, Mahin & Cate

[57] ABSTRACT

The present invention relates to a low solvent content type-coating composition which provides the resultant coating with improved surface appearance, acid resistance, alkali resistance, weathering resistance, scuff resistance and solvent resistance, while the content of an organic solvent of the coating composition can be much reduced to 0 to 30% at 25° C. The low solvent content type-coating composition comprises a vinyl oligomer having a blocked carboxyl group and an additional group selected from an epoxy group, a silanol group, a hydrolyzable silyl group and an acid anhydride group. The vinyl oligomer has a number average molecular weight (Mn) of 600 to 2000, a weight average molecular weight (Mw) of 600 to 5000, and a ratio of a weight average molecular weight/a number average molecular weight (Mw/Mn) of 1.0 to 2.5. The blocked carboxyl group and an additional group may be present in the same or different vinyl oligomers.

20 Claims, No Drawings

LOW SOLVENT CONTENT TYPE-RESIN COMPOSITION, COATING COMPOSITION CONTAINING SUCH RESIN COMPOSITION AND PROCESS FOR COATING SUCH COATING COMPOSITION

TECHNICAL FIELD

The present invention relates to a low solvent content type-resin composition, a coating composition containing such a resin composition as a binder and a process for coating such a coating composition. In particular, the present invention relates to a low solvent content type-coating composition, a coating composition containing such resin composition as a binder, and a process for coating such coating composition, which provide improved surface appearance, acid resistance, alkali resistance, weathering resistance, scuff resistance and solvent resistance and wherein the content of an organic solvent to be used can be much reduced to 0–30% at 25° C.

BACKGROUND OF INVENTION

Recently, there is a tendency to impose strict requirements on the discharge of organic solvents, in order to prevent pollution of the environments to be caused by the evaporation of the organic solvents used in coating compositions. Accordingly, there have been widely investigated aqueous coating compositions without using or without substantially using organic solvents, powder coating compositions and ultraviolet ray curable coating compositions. However, those coating compositions do not provide any sufficient coating properties. For example, the aqueous coating compositions are poor in water resistance and still need at least about 20% of organic solvents. The powder coating compositions need resins having a very higher glass transition temperature. Therefore, there is a problem in that the coating obtained from the powder coating compositions is brittle and cannot meet the requirements of scuff resistance as required for overlayer coatings and interlayer coatings.

On the other hand, there have also been investigated organic solvent type-coating compositions for further reducing the content of the organic solvents. For example, Japanese Patent Unexamined Publication (hereinafter referred to as "Kokai") No. 58-108259 discloses a high solid content coating composition comprising alkoxy melamine resin, a polyol or oligomer having a specific hydoxyl value and an acid catayst, at a specific proportion, so as to make the molecular weight smaller, whereby increasing the solid resin content when the coating composition is coated, while reducing the amount of the organic solvent to be used in the coating composition.

However, in order to supplement the insufficiency of curing which is caused by the lowered molecular weight of the oligomer, the amount of a hydroxyl group must be increased. Since the hydroxyl group has a strong polarity, it is difficult to reduce the viscosity. In addition, when resin having a high hydroxyl value is cured with melamine resin, the performances of the resultant coating, such as acid resistance, etc. were much reduced.

SUMMARY OF THE INVENTION

The objective of the present invention is to provide a low solvent content type-resin composition, a low solvent content type-coating composition containing such a resin composition as a binder and a process for coating such a coating composition, which provide improved surface appearance, acid resistance, alkali resistance, weathering resistance, scuff resistance and solvent resistance and wherein the content of an organic solvent can be much reduced to a very small amount of 0–30%.

The present inventors have made intensive studies in order to achieve the above objective and, as a result, have found that, when a vinyl oligomer having, as essential functional groups, a first functional group of a blocked carboxyl group and a second functional group selected from the group consisting of an epoxy group, a silanol group, a hydrolyzable silyl group and an acid anhydride group, having a number average molecular weight (Mn) of 600 to 2000, a weight average molecular weight (Mw) of 600 to 5000, and a ratio of a weight average molecular weight/a number average molecular weight (Mw/Mn) of 1.0 to 2.5 and wherein the first and second functional groups may be present in the same as or different vinyl oligomers, is used in the coating compositions, the above objective can be attained. The present invention has been completed on the basis of this finding. More specifically, the present invention relates to the following inventions.

1. A low solvent content type-resin composition comprising a vinyl oligomer having, as essential functional groups, a first functional group of a blocked carboxyl group and a second functional group selected from the group consisting of an epoxy group, a silanol group, a hydrolyzable silyl group and an acid anhydride group, having a number average molecular weight (Mn) of 600 to 2000, a weight average molecular weight (Mw) of 600 to 5000, and a ratio of a weight average molecular weight/a number average molecular weight (Mw/Mn) of 1.0 to 2.5 and wherein the first and second functional groups may be present in the same or different vinyl oligomers, the resin composition containing an organic solvent in an amount of 0 to 30% at 25° C.;

2. A low solvent content type-coating composition comprising:
   (1) a vinyl oligomer having, as essential functional groups, a first functional group of a blocked carboxyl group and a second functional group selected from the group consisting of an epoxy group, a silanol group, a hydrolyzable silyl group and an acid anhydride group, having a number average molecular weight (Mn) of 600 to 2000, a weight average molecular weight (Mw) of 600 to 5000, and a ratio of a weight average molecular weight/a number average molecular weight (Mw/Mn) of 1. 0 to 2.5 and wherein the first and second functional groups may be present in the same or different vinyl oligomers; and
   (2) an acidic curing catalyst; and wherein the content of an organic solvent is 0 to 30 % at 25° C.;

3. A process for coating the coating composition of Item 2 above on the surface of a substrate (or an article), and then curing it by heat, whereby forming the coating on the surface; and 4. A process for coating the coating composition of Item 2 above on the surface of a substrate (or an article) at 30° to 80° C.

The present invention will be explained in more detail below.

DISCLOSURE OF INVENTION

The blocked carboxyl group contained as an essential functinal group in the vinyl oligomers may be any blocked carboxyl groups blocked by a blocking agent which can release a carboxyl group by heat and/or water content (such as water or water content in the atmosphere). Such blocked carboxyl group may be represented by the following formula (1):

$$-\underset{\underset{}{\|}}{C}-O-Z. \quad (1)$$

In the formula above, Z means a block group attached to the hydroxyl group of the carboxyl group and derived from the blocking agent. The group Z is preferably the following block groups.

[1] Silyl block group:

The silyl block group is preferably a group having the following formula (2):

$$\underset{\underset{R^3}{|}}{\overset{\overset{R^1}{|}}{-Si-R^2.}} \quad (2)$$

In the formula (2) above, $R^1$–$R^3$ are independently an alkyl or aryl group. The alkyl group includes a linear or branched alkyl group having 1–10 carbon atoms. The preferred alkyl groups include lower alkyl groups having 1–8 carbon atoms, such as a methyl group, an ethyl group, a propyl group, a butyl group, an s-butyl group, a t-butyl group, a pentyl group and a hexyl group. The aryl group includes a phenyl group, a naphthyl group and indenyl group, which may be substituted with a substituent. The preferred aryl group is a phenyl group.

The silyl block group represented by the formula (2) includes trimethylsilyl, diethylmethylsilyl, ethyldimethylsilyl, butyldimethylsilyl, butylmethylethylsilyl, phenyldimethylsilyl, phenyldiethylsilyl, diphenylmethylsilyl and diphenylethylsilyl. In particular, the lower the molecular weight of $R^1$–$R^3$, the lower the volatile content, and therefore it is preferable in view of the reduction of the amount of the organic solvent.

The blocking agent for forming such silyl block group preferably includes halogenated silanes. The halogen atom contained in the halogenated silanes includes a chlorine atom and a bromine atom. The examples of the blocking agents include trimethylsilyl chloride, diethylmethylsilyl chloride, ethyldimethylsilyl chloride, butyldimethylsilyl bromide and butylmethylethylsilyl bromide.

[2] Vinyl ether block group:

The vinyl ether block group is preferably a group having the following formula (3):

$$\underset{\underset{\underset{R^2}{|}}{\underset{HC-R^3}{|}}}{\overset{\overset{R^1}{|}}{-C-O-Y-R^4.}} \quad (3)$$

In the formula above, $R^1$, $R^2$ and $R^3$ are independently a hydrogen atom or a hydrocarbon group having 1–18 carbon atoms. $R^4$ is a hydrocarbon group having 1–18 carbon atoms. $R^3$ and $R^4$ may be combined to form a heterocyclic ring containing Y as a heteroatom. Y is an oxygen atom or a sulfur atom.

The hydrocarbon group includes an alkyl group, a cycloalkyl group and an aryl group. The alkyl group preferably includes lower alkyl groups having 1–8 carbon atoms, such as a methyl group, an ethyl group, a propyl group, a butyl group, an s-butyl group, a t-butyl group, a pentyl group and a hexyl group. The cycloalkyl group preferably includes a cyclopentyl group and a cyclohexyl group. The aryl group preferably includes a phenyl group, a naphthyl group and an anthracene group, which may have a substituent. A pheny group is most preferable as an aryl group.

The vinyl ether block group can be prepared by reacting a hydroxyl group with an aliphatic vinyl ether or thioether or a cyclic vinyl ether or thoiether. The aliphatic vinyl ether includes methylvinyl ether, ethylvinyl ether, isopropyl vinyl ether, n-propyl vinyl ether, isopropyl vinyl ether, 2-ethylhexyl vinyl ether and cyclohexyl vinyl ether, or vinyl thioether corresponding to these vinyl ethers. The cyclic vinyl ether includes 2,3-dihydrofuran, 3,4-dihydrofuran, 2,3-dihydro-2H-pyran, 3,4-dihydro-2H-pyran-2-one, 3,4-dihydro-2-methoxy-2H-pyran, 3,4-dihydro-4,4-dimethyl-2H-pyran, 3,4-dihydro-2-ethoxy-2H-pyran, and 3,4-dihydro-2H-pyran-2-carboxylic acid.

The epoxy group contained as a second functional group in the vinyl oligomers includes acyclic epoxy group and alicyclic epoxy group. The acyclic epoxy group includes those epoxy groups wherein an epoxy bond is formed by an oxygen atom between the carbon atoms in the alkyl group, such as 1,2-epoxy group and 1,3-epoxy group. The alicyclic epoxy group is an epoxy group wherein an oxygen atom is bound to the two adjacent carbon atoms of the five or six-membered alicyclic ring (including bridged carbon-containing hydrocarbons). In this case, the use of the acyclic epoxy group is practically more preferable than the use of the aliphtic epoxy group.

The silanol group contained as a second functional group in the vinyl oligomers may be preferably represented by the following formula (4):

$$\underset{\underset{R^2}{|}}{\overset{\overset{R^1}{|}}{-Si-OH.}} \quad (4)$$

In the formula, $R^1$ and $R^2$ may be the same as or different from each other and are a hydroxyl group, an alkyl group, an alkoxy group, —$NR^1R^2$ group ($R^1$ and $R^2$ are an alkyl group or an aryl group), —$NR^1CO^3$ ($R^1$ and $R^2$ are an alkyl group or an aryl group), —$COR^1$ group ($R^1$ is an alkyl group or an aryl group), —$OCOR^1$ group ($R^1$ is an alkyl group or an aryl group), an aryl group, —$ONR^1R^2$ group ($R^1$ and $R^3$ are an alkyl group or an aryl group), or —$ONCR^1R^2$ group ($R^1$ and $R^3$ are an alkyl group or an aryl group).

The alkyl group includes a linear or branched alkyl group having 1–10 carbon atoms, such as a methyl group, an ethyl group, a propyl group, an isopropyl group, a butyl group, an isobutyl group, an s-butyl group, a t-butyl group and a pentyl group. The alkoxy group includes those alkoxy groups whose alkyl moiety is the same as the above alkyl group. The aryl group especially includes a phenyl group which may be substituted with a substituent. The substituent includes a halogen atom, an alkyl group, an alkoxy group and the like. The halogen atom as a substituent includes a fluorine atom, a chlorine atom, bromine atom, and an iodine atom. The alkyl group as a substituent includes a linear and branched alkyl groups having 1–10 carbon atoms, such as a methyl group, ethyl group, propyl group, isopropyl group, butyl group, isobutyl group, s-butyl group, t-butyl group, and pentyl group. The alkoxy group as a substituent includes those alkoxy groups whose alkyl moiety corresponds to the alkyl group as stated above. The prefered substituent includes a halogen atom such as a fluorine atom and a lower alkyl group having 1–5 carbon atoms.

The hydrolyzable silyl group contained as second functional group in the vinyl oligomers is a silanol group blocked with a hydrolyzable group and may be preferably represented by the following formula (5):

In the formula, $R^1$ and $R^2$ are the same as those of the formula (4); and $R^3$ is an alkyl group, $-NR^1R^2$ group ($R^1$ and $R^2$ are an alkyl group or an aryl group), $-COR^1$ group ($R^1$ is an alkyl group or an aryl group), an aryl group, and $-NCR^1R^2$ group ($R^1$ and $R^2$ are an alkyl group or an aryl group).

The acid anhydride group contained as a second functional group in the vinyl oligomers is represented by the formula: $-CO-O-CO-$.

When the number average molecular weight (Mn) of the vinyl oligomers used in the coating composition is smaller than 600, the formability of the coating is reduced, the strength of the resultant coating is reduced and the gasoline resistance and scuff resistance of the resultant coating are reduced. On the other hand, when the Mn is larger than 2000, the viscosity of the coating composition increases to much degree. The Mn is preferably 600 to 1900, much preferably 600 to 1800.

The Mw/Mn ratio of the vinyl oligomers used in the coating composition is 1.0 to 2.5. When the Mw/Mn ratio is larger than 2.5, the relative proportions of the oligomers having a too large and too small molecular weights become large and, therefore, there appear the problems encountered when the oligomers having too large and too small molecular weights are employed. The lower limit for the Mw/Mn ratio is theoretically 1.0. The smaller the molecular weight of the oligomers, the more easily the Mw/Mn approaches 1.0. In such a case, the coating compositions having very uniform properties can be obtained. The Mw/Mn ratio is preferably 1.0 to 1.8, much preferably 1.0 to 1.6.

The Mw of the oligomers is 600 to 5000, in accordance with the Mn and the Mw/Mn ratio as stated above. The Mw of the oligomers is preferably 1000 to 3500, much preferably 1200 to 3000.

In the vinyl oligomers, the blocked carboxyl group releases a blocking agent by heat or water content to form a free carboxyl group.

The epoxy group as a second functional group reacts with the free carboxyl group to form an ester bond and also form a secondary hydroxyl group.

The silanol group as a second functional group reacts with the formed hydroxyl group to form an Si—O bond. The hydrolyzable silyl group forms a silanol group in the presence of water content and if preferably, in the presence of a dissociation catalyst such as phosphoric acid, carboxylic acid, dibutyltin dilaurate, dimethyltin dichloride and dibutyltin dimaleate. The resultant silanol group reacts with a hydroxyl group to form an Si—O bond in the same manner as above. Further, the silanol groups react with each other to form an Si—O—Si bond. The presence of the Si—O bond and Si—O—Si bond in the coating improves the coating strength and increases the coating flexibility.

The blocking of the carboxyl group and silanol group with the blocking agent prevents the polarity of these groups and therefore provides the coating composition with low viscosity even when the organic solvent content is much reduced.

The acid anhydride group generates a free carboxyl group in the presence of water. The resultant carboxyl group reacts with an epoxyl group in the same manner as stated above, to form an ester bond and a secondary hydroxyl group.

The present oligomers can be prepared by (co)polymerizing (hereinafter also referred to as merely "polmerizing") monomers having the first or second functional group and a polymerizable unsaturated bond group. For example, when the vinyl oligomers are prepared from acrylic acid or methacrylic acid having a first or second functional group, such oligomers are acrylic oligomers.

The first and second functional groups may be present in the same oligomers or may be present in different oligomers.

The number of the first functional groups in one oligomer varies dependent on the molecular weight of the oligomers. The number of the first functional group is preferably 1 to 5 per oligomer, much preferably 2 to 4 per oligomer. When the number of the first functional group is less than 2 per oligomer, the coating strength is reduced and, therefore, such number is not preferable. On the other hand, when the number of the first functional group is more than 4 per oligomer, the viscosity of the coating composition becomes too large and the resultant coating becomes brittle and, therefore, such number is not preferable.

The number of the second functional groups in one oligomer varies dependent on the molecular weight of the oligomers. The number of the second functional group is preferably 1 to 5 per oligomer, much preferably 2 to 4 per oligomer. When the number of the second functional group is less than 2 per oligomer, the coating strength is reduced and, therefore, such number is not preferable. On the other hand, when the number of the second functional group is more than 4 per oligomer, the coating shrinkes by curing and is easy to break and, therefore, such number is not preferable.

The amount ratio of the first functional group to the second functional group (in respect of mole/kg-resin) is generally 3:1 to 1:3, preferably 2:1 to 1:2. When the ratio of the first functional group to the second functional group is larger than 3:1, sufficient cross-linking density cannot be obtained. On the other hand, when the ratio is smaller than 1:3, sufficient cross-linking density cannot be obtained and the amount of the remaining functional groups becomes large.

More specifically, the amount ratio of a blocked carboxyl group as a first functional group to an epoxy group as a second functional group in respect of mole/kg-resin is generally 0.7 to 1.3:1.0, preferably 0.8 to 1.2:1.0, much preferably 1.0:1.0. When the amount of a blocked carboxyl group is smaller than 0.7:1.0, the cross-linking density becomes lower and the scuff resistance and solvent resistance of the coating are reduced. On the other hand, when the amount of a blocked carboxyl group is larger than 1.3:1.0, a carboxyl group remains in the resultant coating and accordingly the water resistance of the coating is reduced.

The amount ratio of a blocked carboxyl group to a silanol or hydrolyzable silyl group in respect of mole/kg-resin is generally 0.5 to 3.0:1.0, preferably 0.7 to 2.5:1.0, much preferably 2.0:1.0. When the amount of a blocked carboxyl group is smaller than 0.5:1.0, the cross-linking density becomes lower and the scuff resistance and solvent resistance of the coating are reduced. On the other hand, when the amount of a blocked carboxyl group is larger than 3.0:1.0, a carboxyl group remains in the resultant coating and accordingly the water resistance of the coating is reduced.

The amount ratio of a blocked carboxyl group to an acid anhydride group in respect of mole/kg-resin is generally 1.0 to 5.0:1.0, preferably 2.4 to 4.0:1.0, much preferably 3.0:1.0. When the amount of a blocked carboxyl group is smaller than 1.0:1.0, the cross-linking density becomes lower and the scuff resistance and solvent resistance of the coating are reduced. On the other hand, when the amount of a blocked carboxyl group is larger than 5.0:1.0, a carboxyl group remains in the resultant coating and accordingly the water resistance of the coating is reduced.

The combinations of the first and second functional groups incorporated into one molecule of the oligomer include:

(1) In case where oligomers have a blocked carboxyl group

In this case, the following combinations are included.

A combination of a blocked carboxyl group and an epoxy group; a combination of a blocked carboxyl group and a silanol and/or hydrolyzable silyl group; and a combination of a blocked carboxyl group and an acid anhydride group.

(2) In case where oligomers have a blocked carboxyl group and an epoxy group

In this case, the following combinations are included.

A combination of a blocked carboxyl group, an epoxy group and a silanol group and/or a hydrolyzable silyl group; and a combination of a blocked carboxyl group, an epoxy group, a silanol group group and/or a hydrolyzable silyl group, and an acid anhydride group.

(3) In case where oligomers have a blocked carboxyl group, an epoxy group, a silanol group group and/or a hydrolyzable silyl group, and an acid anhydride group (4) In case where oligomers do not have a blocked carboxyl group In this case, the following combinations are included.

A combination of only an epoxy group, a combination of only a silanol group and/or a hydrolyzable silyl group; a combination of only an acid anhydride group; a combination of an epoxy group and a silanol group and/or a hydrolyzable silyl group; a combination of an epoxy group and an acid anhydride group; a combination of a silanol group and/or a hydrolyzable silyl group and an acid anhydride group; and a combination of an epoxy group, a silanol group and/or a hydrolyzable silyl group and an acid anhydride group.

The amount (in respect of mole/kg-resin) of a blocked carboxyl group as the first functional group is usually 1 to 5 moles/kg-resin, preferably 2 to 4 moles/kg-resin. When the amount is less than 1 mole/kg-resin, the scuff resistance and gasoline resistance of the resultant coating are reduced and, therefore, such amount is not suitable. On the other hand, when the amount is larger than 5 moles/kg-resin, the volatile content of the blocking group becomes too large as compared with the decrease in viscosity and, therefore, such amount is not suitable.

The amount (in respect of mole/kg-resin) of an epoxy group as the second functional group is usually 1 to 5 moles/kg-resin, preferably 2 to 4 moles/kg-resin. When the amount is less than 1 mole/kg-resin, the scuff resistance and gasoline resistance of the resultant coating are reduced and, therefore, such amount is not suitable. On the other hand, when the amount is larger than 5 moles/kg-resin, the viscosity becomes too large and, therefore, such amount is not suitable.

The amount (in respect of mole/kg-resin) of a silanol group group and/or a hydrolyzable silyl group as the second functional group is usually 1.0 to 3.0 moles/kg-resin, preferably 1.5 to 2.0 moles/kg-resin. When the amount is larger than 3.0 moles/kg-resin, the cross-linking density becomes too large and the resultant coating becomes brittle, therefore, such amount is not suitable.

The amount (in respect of mole/kg-resin) of an acid anhydride group as the second functional group is usually 0.5 to 2.0 moles/kg-resin, preferably 1.0 to 1.5 moles/kg-resin. When the amount is larger than 2.0 moles/kg-resin, the cross-linking density becomes too large and the resultant coating becomes brittle, therefore, such amount is not suitable.

The total number of the functional groups contained in the present oligomer molecule is 2 to 5 moles/kg-resin, preferably 3 to 4 moles/kg-resin, in case where a silanol group or a hydrolyzable silyl group is not contained in the oligomer. When the total number is less than 2 moles/kg-resin, the cross-linking density becomes small and the strength and flexibility of the resultant coating are reduced and, therefore, the coating properties such as the impact resistance, scuff resistance, gasoline resistance and chipping resistance of the resultant coating are reduced. On the other hand, when the total number is more than 5 moles/kg-resin, the cross-linking density becomes too large and, therefore, the coating properties are deteriorated as in case where the resultant coating becomes brittle. In case where a silanol group or a hydrolyzable silyl group is contained in the oligomer, the total number of the functional groups in the oligomers is 2 to 15 moles/kg-resin, preferably 3 to 12 moles/kg-resin. When the total number is less than 2 moles/kg-resin, the cross-linking density becomes small. On the other hand, when the total number is more than 15 moles/kg-resin, the cross-linking density becomes too large and, therefore, the resultant coating becomes brittle. In this connection, when the total number is selected, it is necessary to consider the relation between the total number and the molecular weight of the oligomer. More specifically, when the molecular weight of the oligomer is small, there are generated vinyl oligomers having no functional groups if the total number of the functional groups is not high. In such a case, the coating performance of the resultant coating cannot be fully utilized. In case where the molecular weight of the oligomers is high, it makes viscous the coating composition and, therefore, such case is not suitable. In any event, the suitable combination of the molecular weight and the total number can be experimentally determined by a person skilled in the art.

The glass transition temperature (Tg) of the oligomer used in the coating composition is preferably −35° to 40° C., much preferably −10° to 30° C. When the Tg is higher than 40° C., the coating viscosity becomes too high and, therefore, such Tg is not suitable. On the other hand, when Tg is lower than −35° C., the resutant coating becomes too soft and the gasoline resistance of the resultant coating becomes low, and therefore such Tg is not suitable.

The vinyl oligomers containing, in a molecule, a first functional group of a blocked carboxyl group and a second functional group selected from the group consisting of an epoxy group, a silanol group, a hydrolyzable silyl group, and an acid anhydride group or the vinyl oligomers containing only a second functional group have the Mn, Mw and Mw/Mn ratio which are within the ranges as already defined above.

The vinyl oligomers used in the present invention can be prepared by polymerizing monomers having a first and/or second functional group and a polymerizable unsaturated bond group in a molecule.

The polymerization of the monomers can be carried out by the conventional methods. For example, the polymerization can be carried out by ionic polymerization such as anionic polymerization and cationic polymerization, or radical polymerization. Among those polymerization methods, the radical polymerization is preferred in view of the easiness of the polymerization. In this connection, since the vinyl oligomers having a lower molecular weight must be prepared for the present invention, it is preferable, for example, that mercaptans such as mercaptoethanol, thioglycerol and lauryl mercaptan or chain transfer agents should be used in the polymerization, or that the polymerization should be carried out at 60° to 180° C., or that the monomer concentration should be lowered. In this connection, the polymerization of the monomers having a carboxyl group blocked by a vinyl ether group is preferably carried out at 60° to 100° C. When the polymerization is carried out at a temperature of higher than 100° C., the blocking agent is easy to be released.

The structure of the vinyl oligomer is not restricted and may include any type of structures such as a linear structure, a branched structure, a comb structure, a block structure, a star-type structure and a star burst-type structure.

The radical polymerization should be preferably carried out in solutions. The solvents used for such polymerization may be any solvents conventionally used for the radical polymerization of acrylic monomers in solutions. The solvents include toluene, xylene, butyl acetate, methylethyl ketone, methylisobutyl ketone and solvesso (manufactured by Exxon).

The radical initiator used for the radical solution polymerization may be any initiators conventionally used for the radical polymerization. The initiator includes peroxides such as benzoyl peroxide, lauroyl peroxide, t-butyl hydroperoxide and t-butylperoxy-2-ethylhexanol and azo compounds such as azobis-valeronitrile, azobis-isobutyronitrile and azobis(2-methypropiononitrile).

As monomers having a blocked carboxyl group, there may be preferably used monomers having a blocked carboxyl group having the formula (1) and a radically polymerizable unsaturated bond group.

As a radically polymerizable unsaturated bond group, preferred are radically polymerizable vinyl groups represented by the formula: $CHR^1=CR^2—$ wherein $R^1$ and $R^2$ are independently a hydrogen atom, an alkyl group or a single bond. The alkyl group may be linear or branched and includes those alkyl groups of C1 to 20, such as methyl, ethyl, propyl and butyl groups. Such monomers include, for example, those monomers obtained by blocking monomers having a carboxyl group and a radically polymerizable unsaturated bond group, with a blocking agent.

The monomers having a carboxyl group and a radically polymerizable unsaturated bond group may contain plural carboxyl groups. The monomers containing a single carboxyl group preferably include (meth)acrylic acid. The monomers containing two carboxyl groups preferably include itaconic acid, maleic acid, mesaconic acid and fumalic acid. They may be compounds produced by reacting an acid anhydride such as maleic anhydride and itaconic anhydride, with alcohols of C1 to 18 or amines. Such alcohols inlcude alcohols such as methanol, ethanol, propanol and butanol. When the carbon number of the alcohols is larger than 18, the plasticity of the resultant coating becomes too large and, therefore, such carbon number is not suitable.

Such amines include aliphatic amines such as dibutylamine, dihexylamine, methylbutylamine, ethylbutylamine and n-butylamine and aromatic amines such as aniline and toluidine.

As monomers containing an epoxy group as a second functional group, preferred are those monomers containing, in a molecule, an epoxy group and the radically polymerizable unsaturated bond group as stated above.

Such monomers containing an epoxy group and a radically polymerizable unsaturated bond group include epoxy group-containing alicyclic or acyclic monomers such as glycidyl (meth)acrylates and 3,4-epoxycyclohexyl (meth) acrylates.

As monomers having a silanol group or a hydrolyzable silyl group, there are preferably used monomers having a silanol group or a hydrolyzable silyl group as defined by the formulae (3) and (4) and a radically polymerizable unsaturated bond group.

The radically polymerizable unsaturated bond group is suitably represented by the following formulae:

In the formulae (6) to (10) above, $R^1$ is a hydrogen atom or an alkyl group having 1–6 carbon atoms, and Y is a phenylene group.

The alkyl group may be linear or branched and includes methyl, ethyl, propyl, n-butyl, s-buty, t-butyl, n-pentyl, s-pentyl, hexyl, n-heptyl, s-heptyl, octyl, nonyl, decyl and undecyl groups. The preferred akyl groups include methyl and ethyl groups.

The monomers having the radically polymerizable unsaturated bond represented by the formula (6) are preferably the following ones.

In the formula (11), $R^1$ is defined above, $R^2$ is a bivalent aliphatic hydrocarbon group, X is a silanol group or a hydrolyzable silyl group represented by the formulae ( 4 ) or ( 5 ).

The bivalent aliphatic hydrocarbon group as $R^2$ includes an alkylene group, a cycloalkylene group and an arylene group.

The alkylene group includes a linear or branched alkylene group, such as a methylene group, an ethylene group, a propylene group, a butylene group, an isobutylene group and a hexamethylene group. The cycloalkylene group includes a cyclopentylene group and a cyclohexylene group. The arylene group includes o-, m- or p-phenylene group, a naphthalene group, a fluorene group, an indolene group, an anthracene group, a furan group, and a thiophene group.

The examples of the monomers represented by the formula (11) include γ-(meth)acryloyloxypropyltrimethoxysilane, γ-(meth)acryloyloxypropyltriethoxysilane, γ-(meth)acryloyloxypropyltripropoxysilane, γ-(meth)acryloyloxypropylmethyldimethoxysilane, γ-(meth)acryloyloxypropylmethyldiethoxysilane, γ-(meth)acryloyloxypropylmethyldipropoxysilane, γ-(meth)acryloyloxybutylphenyldimethoxysilane, γ-(meth)acryloyloxyphenyldiethoxysilane, γ-(meth)acryloyloxyphenyldipropoxysilane, γ-(meth)acryloyloxypropyldimethylmethoxysilane, γ-(meth)acryloyloxypropyldimethylethoxysilane, γ-(meth)acryloyloxypropylphenylmethylmethoxysilane, γ-(meth)acryloyloxypropylphenylmethylethoxysilane, γ-(meth)

acryloyloxypropyltrisilanol, γ-(meth)acryloyloxypropylmethyldihydroxysilane, γ-(meth)acryloyloxybutylphenyldihydeoxysilane, γ-(meth)acryloyloxypropyldimethylhydroxysilane and γ-(meth)acryloyloxypropylphenylmethylhydroxysilane.

The examples of the monomers having a radically polymerizable unsaturated bond group represented by the formula (7) include the following monomers (12) to (14).

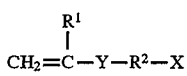 (12)

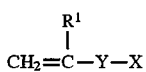 (13)

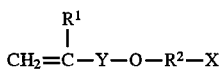 (14)

In the formulae, $R^1$, $R^2$, Y and X are defined above.

The examples of the monomers represented by the formulae (12) to (14) include the following monomers.

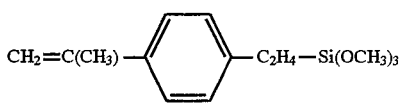

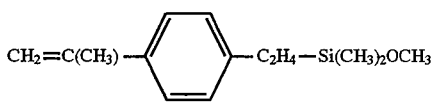

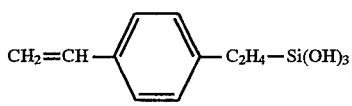

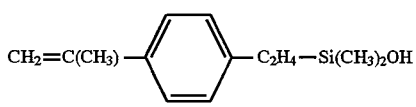

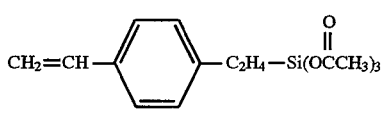

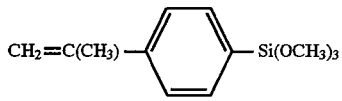

The monomers having the radically polymerizable unsaturated bond group as represented by the formula (8) include the following monomers.

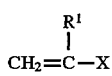 (15)

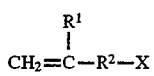 (16)

In the formulae above, $R^1$, $R^2$ and X are defined above. The examples of the monomers represented by the formulae (15) and (16) include the following monomers.

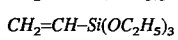

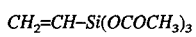

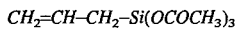

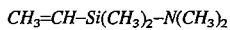

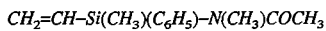

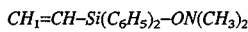

The monomers having the radically polymerizable unsaturated bond group as represented by the formula (9) include the following monomers.

 (17)

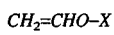 (18)

In the formulae above, $R^2$ and X are defined above. The examples of the monomers represented by the above formulae include the following monomers.

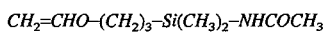

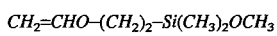

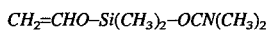

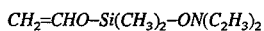

The monomers having the radically polymerizable unsaturated bond group as represented by the formula (10) include the following monomers.

 (19)

 (20)

In the formulae above, $R^2$ and X are defined above. The examples of the monomers represented by the above formulae are as follows.

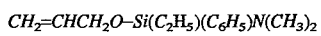

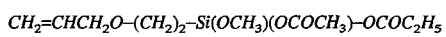

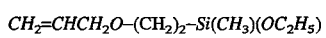

Monomers used for producing vinyl oligomers having a silanol group or hydrolyzable silyl group are preferably those monomers having the radically polymerizable unsaturated bond group as represented by the formulae (6) and (7), in view of the improved appearance of the resultant coating and easiness of the polymerization. Polysiloxane macromers which are produced by polymerizing acrylic monomers with silane type monomers are also usable.

Such polysiloxane macromers include the following compounds:

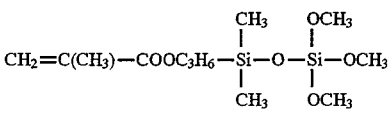

-continued $$CH_2=CH-COOC_3H_6-\underset{\underset{CH_3}{|}}{\overset{\overset{CH_3}{|}}{Si}}-O-\underset{\underset{OCH_3}{|}}{\overset{\overset{OCH_3}{|}}{Si}}-OCH_3$$

$$CH_2=C(CH_3)-COOCH_2+\underset{\underset{CH_3}{|}}{\overset{\overset{CH_3}{|}}{Si}}-O\overset{}{\underset{10}{}}-\underset{\underset{OCOCH_3}{|}}{\overset{\overset{OCH_3}{|}}{Si}}-OCOCH_3$$

$$CH_2=C(CH_3)-Ph+\underset{\underset{CH_3}{|}}{\overset{\overset{CH_3}{|}}{Si}}-O\overset{}{\underset{10}{}}-\underset{\underset{CH_3}{|}}{\overset{\overset{CH_3}{|}}{Si}}-N(CH_3)_2$$

$$CH_2=CH+\underset{\underset{Ph}{|}}{\overset{\overset{Ph}{|}}{Si}}-O\overset{}{\underset{6}{}}+\underset{\underset{CH_3}{|}}{\overset{\overset{CH_3}{|}}{Si}}-O\overset{}{\underset{5}{}}\underset{\underset{CH_3}{|}}{\overset{\overset{CH_3}{|}}{Si}}-OCN(CH_3)_2$$

$$CH_2=CHO+\underset{\underset{CH_3}{|}}{\overset{\overset{CH_3}{|}}{Si}}-O\overset{}{\underset{10}{}}-\underset{\underset{CH_3}{|}}{\overset{\overset{CH_3}{|}}{Si}}-ON(C_2H_5)_2$$

$$CH_2=CHCH_2O+\underset{\underset{Ph}{|}}{\overset{\overset{Ph}{|}}{Si}}-O\overset{}{\underset{10}{}}-\underset{\underset{Ph}{|}}{\overset{\overset{Ph}{|}}{Si}}-NHCOC_3H_7$$

In the formulae above, Ph is a phenyl group.

The monomers having an acid anhydride group and a radically polymerizable unsaturated bond group include monomers which form an internal acid anhydride group, such as itaconic anhydride and maleic anhydride, and monomers produced by condensing monomers having, in a molecule, a radically polymerizable unsaturated bond group and one carboxyl group and compounds having a carboxyl group, according to the dehydration reaction or de-alcoholation reaction. The compounds having one carboxyl group may be those compounds which may or may not contain a radically polymerizable unsaturated bond group, and include methacrylic anhydride and monomers produced by condensing divalent monoesters of polybasic acids such as monoalkylesters of maleic acid or itaconic acid by the de-alcoholation reaction.

In the production of the vinyl oligomers, other polymerizable monomers such as α, β-ethylenically unsaturated monomers may be used. Such α, β-ethylenically unsaturated monomers include the following monomers:

(1) esters of acrylic or methacrylic acid;

For example, C1–18 alkyl esters of acrylic or methacrylic acid, such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; C2–18 alkoxy alkyl esters of acrylic or methacrylic acid, such as methoxybutyl acrylate, methoxybutyl methacrylate, methoxy ethyl acrylate, methoxy ethyl methacrylate, ethoxy butyl acrylate and ethoxy butyl methacrylate; C2–8 alkenyl esters of acrylic or methacrylic acid, such as allyl acrylate and allyl methacrylate; C3–18 alkenyloxyalkyl esters of acrylic or methacrylic acid, such as allyloxyethyl acrylate and allyloxyethyl methacrylate.

(2) vinyl aromatic compound;

For example, vinyl acetate, hexafluoropropylene, tetrafluoropropylene, styrene, α-methyl styrene, vinyltoluene and p-chlorostyrene.

(3) polyolefin compounds;

For example, butadiene, isoprene and chloroprene.

(4) allyl ethers;

For example, hydroxy ethyl allyl ether.

(5) others;

For example, methacrylamide, acrylamide, diacrylamide, dimethacrylamide, acylonitrile, methacrylonitrile, methyl isopropenyl ketone, vinyl acetate, vinyl propionate, vinyl pivalate, acrylic acid, methacrylic acid, N,N-dialkylaminoalkyl(meth)acrylate, phosphoric acid-containing (meth)acrylate such as phosphonoxyethyl (meth)acrylcate, perfluorovinyl ether such as trifluoromethyl vinyl ether, and vinyl ethers such as hydroxyethyl vinyl ether and hydroxybutyl vinyl ether.

The coating composition of the present invention comprises, as well as the vinyl oligomers as stated above, curing catalysts for promoting the reaction among the functional groups of the oligomers, to form cross-linking therebetween. As the curing catalysts, any acidic catalysts may be used.

Such curing catalysts include protonic acids or those neutralized with Lewis bases, Lewis acids or those neutralized with Lewis bases, phosphoric acid, polyphosphoric acid or mono- or di-esters thereof, halogenated carboxylic acids, sulfuric acid, sulfonic acids or the esters thereof, and boric acid or mono- or di-esters thereof. Preferably, the following catalysts can be used.

(1) Protonic acids or those neutralized with Lewis bases:

The protonic acids include hydrohalogenic acids such as hydrofluoric acid, hydrogen chloride and hydrogen bromide, sulfuric acid and monoesters of sulfuric acid, phosphoric acid and mono- or di-esters of thereof, esters of polyphosphoric acid, boric acid and mono- or di-esters thereof, sulfonic acids such as p-touenesulfonic acid, methane sulfonic acid, dodecylbenzene sulfonic acid and trifluoromethane sulfonic acid, and trifluoroacetic acid.

The alcohols constituting of the esters of protonic acids include primary alcohols such as n-propyl alcohol, n-butanol, n-hexanol and n-octanol, and secondary alcohols such as isopropanol, s-butanol and s-hexanol.

The Lewis bases include ammonium, amines such as monoethyl amine, triethyl amine, pyridine, piperidine, aniline, morpholine, cyclohexyl amine, n-butyl amine, monoethanol amine, diethanol amine and triethanol amine, phosphines such as trialkylphosphines and triaryl phosphines, and triarylphosphites.

(2) Lewis acids or those neutralized with Lewis bases:

The Lewis acids include boron trifluoride, diethylether complexes of boron trifluoride, aluminum trichloride, iron trichloride, tin tetrachloride, zinc dichloride and titanium tetrachloride. The Lewis bases used for neutralizing Lewis acids include those as mentioned above.

(3) Esters of sulfonic aids:

The esters of sulfonic acids are preferably presented by the following formula (21):

$$R^1-\underset{\underset{O}{\|}}{\overset{\overset{O}{\|}}{S}}-O-R^2 \qquad (21)$$

In the formula above, $R^1$ is a phenyl group, a naphthyl group and an alkyl group. $R^2$ is a hydrogen atom, an aklyl group, an alkenyl group, an aryl group, an alkaryl group, an alkanol group, and a cycloalkyl group.

The phenyl group or naphthyl group as $R^1$ includes substituted or unsubstituted phenyl group or naphthyl group. The substituent includes a halogen atom, an alkyl group having 1–8 carbon atoms, a cycloalkyl group having 5–7 carbon atoms or an alkoxy group having 1–8 carbon atoms.

The alkyl group as $R^1$ includes a linear or branched alkyl group having 1–18 carbon atoms, such as a methyl group, an ethyl group, a propyl group, an isopropyl group, a butyl group, an isobutyl group, an s-butyl group, a t-butyl group, an n-pentyl group, a hexyl group and an octyl group.

The alkyl group as $R^2$ is the same as $R^1$ as mentioned above.

The alkenyl group as $R^2$ is a linear or branched alkenyl group having 3–18 carbon atoms, such as a propenyl group, a butenyl group, and a pentenyl group.

The aryl group as $R^2$ includes a phenyl group or a naphthyl group as mentioned above.

The alkaryl group as $R^2$ includes those constituted of the alkyl groups as stated above and the aryl groups as stated above.

The alkanol group as $R^2$ includes those alkanol groups having 1–18 carbon atoms, such as an ethanol group, a propanol group, an n-butanol group, an s-butanol group, a t-butanol group, an n-pentanol group, and an s-pentanol group.

The cycloalkyl group as $R^2$ includes a linear or branched cycloalkyl group having 5–10 carbon atoms, such as a cyclopentyl group, 2-methylcyclopentyl group and a cyclohexyl group.

The examples of such compounds include sulfonic acids such as methane sulfonic acid, ethane sulfonic acid, benzene sulfonic acid, dodecylbenzene sulfonic acid, naphthalene sulfonic acid and nonylbenzene sulfonic acid and the esters thereof with primary alcohols such as n-propanol, n-butanol, n-hexanol and n-octanol or secondary alcohols such as isopropanol, s-butanol and s-hexanol.

(4) Esters of phosphoric acids:

The following esters of phosphoric acid having the formula (22) are included.

(22)

In the formula above, $R^1$ is an alkyl group having 3–10 carbon atoms, a cycloalkyl group having 5–10 carbon atoms, an aryl group having 6–20 carbon atoms, and m is 1 or 2.

The alkyl group as $R^1$ includes a linear or branched alkyl group, such as a propyl group, an isopropyl group, an n-butyl group, an s-butyl group, a t-butyl group, an n-pentyl group, a hexyl group, a heptyl group, and an octyl group.

The cycloalkyl group as $R^1$ includes linear or branched cycloalkyl group, such as a cyclopentyl group, 2-methyl cyclopentyl group, and cyclohexyl group.

The aryl group as $R^1$ includes a phenyl group or a naphthyl group which may have a substituent. The substituent includes a halogen atom, an alkyl group having 1–8 carbon atoms, a cycloalkyl group having 5–7 carbon atoms and an alkoxy group having 1–8 carbon atoms.

The examples of the compounds include mono- or diesters of phosphoric acid with primary alcohols such as n-propanol, n-butanol, n-hexanol and n-octanol or secondary alcohols such as isopropanol, s-butanol, s-hexanol and cyclohexanol.

(5) Onium salts

The onium salts include those represented by the following formulae (23) to (26):

$[R^1{}_4NR^2]^+X^-$ (23)

$[R^1{}_4PR^2]^+X^-$ (24)

$[R^1{}_3OR^2]^+X^-$ (25)

$[R^1{}_3SR^2]^+X^-$ (26).

In the formular above, $R^1$ is an alkyl group, an alkenyl group, an aryl group, an alkaryl group, an alkanol group or a cycloalkyl group. Two $R^1$ may be combined with each other to form a heterocyclic ring together with a hetero atom such as N, P, O or S.

The alkyl group as $R^1$ includes a linear or branched alkyl group having 1–12 carbon atoms, such as a methyl group, an ethyl group, a propyl group, an isopropyl group, an n-butyl group, an s-butyl group, a t-butyl group, an n-pentyl group, a hexyl group, a heptyl group and an octyl group.

The alkenyl group as $R^1$ includes a linear or branched alkenyl group having 3–12 carbon atoms, such as a propenyl group, a butenyl group and a pentenyl group.

The aryl group as $R^1$ includes a substituted or unsubstituted phenyl group or a naphthyl group. The substituent includes a halogen atom, an alkyl group having 1–8 carbon atoms, a cycloalkyl group having 5–7 carbon atoms and an alkoxy group having 1–8 carbon atoms.

The alkaryl group as $R^1$ includes those constituted of the alkyl groups as stated above and the aryl groups as stated above.

The alkanol group as $R^1$ includes alkanol groups having 1–12 carbon atoms, such as an ethanol group, a propanol group, an n-butanol group, an s-butanol group, a t-butanol group, an n-pentanol group, and an s-pentanol group.

The cycloalkyl group as $R^1$ includes a linear or branched cycloalkyl group having 5–10 carbon atoms, such as a cyclopentyl group, 2-methylcyclopentyl group and a cyclohexyl group.

$R^2$ includes a hydrogen atom, an alkyl group, an alkenyl group, an aryl group and an alkaryl group. Those groups are the same as $R^1$.

$X^-$ includes $SbF_6^-$, $AsF_6^-$, $PF_6^-$ or $BF_4^-$.

Among those acidic catalysts, protonic acids neutralized with Lewis bases, Lewis acids neutralized with Lewis bases, and the compounds represented by the formulae (23) to (26) are called heat-potential cationic polymerization catalysts and form acidic catalysts by heating them, for example, at 50° to 200° C. so as to catalyze the curing of the resin. Such heat-potential acidic catalysts cannot catalyze the curing reaction when they are not heated. The viscosity of the coating composition does not increase and the composition does not gel, even though it is stored as it is for a long period of time. Therefore, it is very easy to handle.

The preferred heat-potential acidic catalyst includes quaternary ammonium salts, sulfonium salts, phosphonium salts and iodonium salts.

The quaternary ammonium salts include N,N-dimethyl-N-benzylanilinium hexafluoroantimonate, N,N-dimethyl-N-benzylanilinium tetrafluoroborate, N,N-dimethyl-N-benzylpyridinium hexafluoroantimonate, N,N-diethyl-N-benzyl trifluoromethanesulfonic acid, N,N-dimethyl-N-(4-methoxybenzyl)pyridinium hexafluoroantimonate, N,N-diethyl-N-(4-methoxybenzyl)pyridinium hexafluoroantimonate, and N,N-diethyl-N-(4-methoxybenzyl)toludinium hexafluoroantimonate.

The sulfonium salts include triphenylsulfonium tetrafluoroborate, triphenylsulfonium hexafluoroantimonate, triphenylsulfonium hexafluoroarsenate, Adeca CP-66 (manufactured by Asahi Denka Kogyo), Adaca CP-77 (manufactured by Asahi Denka Kogyo), tri(4-methoxyphenyl) sulfonium hexafluoroarsenate, and diphenyl(4-phenylthiophenyl)sulfonium hexafluoroarsenate.

The phosphonium salts include ethyltriphenylphosphonium hexafluoroantimonate, and tetrabutyl phosphonium hexafluoroantimonate.

The iodonium salts include diphenyliodonium hexafluoroarsenate, di-4-chlorophenyliodonium hexafluoroarsenate, di-4-bromophenyliodonium hexafluoroarsenate, di-p-triiodonium hexafluoroarsenate, and phenyl-(4-methoxylphenyl)iodonium hexafluoroarsenate.

The curing catalyst is used in a catalytic amount in the present coating composition. Specifically, the catalyst is used in an amount of 0.01 to 30 weight parts, preferably 0.1 to 10 weight parts, based on 100 weight parts of the vinyl oligomer used in the present coating composition. When the amount of the catalyst is too small, the coating appearance and curability are deteriorated. On the other hand, when the amount of the catalyst is too much, the coating composition cures before the composition is applied to the material to be coated, the coating is colored and the coating properties are deteriorated.

In this connection, the heat-potential curing catalysts can be heated generally at 50°–200° C., preferably 90° to 160° C. for 2 min. to one hour, to promote the curing of the present resin composition. In case where the coating composition is used in two-liquid type, two liquids are combined just before the use thereof for coating and, therefore, substantially no consideration is necessary to be made on the curing of the resin. Accordingly, it is not so necessary to use such heat-potential curing catalysts.

The present resin composition can be used as it is, or in a combination thereof with various pigments (such as coloring pigments or brightening agents), anti-sagging agents or anti-settling agents, leveling agents, dispersants, anti-foaming agents, ultraviolet ray-absorbing agents, light stabilizers, anti-static agents, thinners and the like, which are conventionally used in the coating field.

The preferred examples of the pigments or brightening agents include titanium oxide, carbon black, precipitatable barium sulfate, calcium carbonate, talc, kaolin, silica, mica, aluminum, blood red, lead chromate, lead molybdate, chromium oxide, cobalt aluminate, azo pigments, phthalocyanine pigments, and anthraquinone pigments.

The preferred examples of the anti-sagging agents or anti-settling agents include bentonite, castor oil wax, amide wax, microgel and alumium acetate.

The preferred examples of the leveling agents include silicon-type agents such as KF69, KP321 and KP301 (manufactured by The Shin-Etsu Chemical Co., Ltd.), Modaflow (manufactured by Mitsubishi Monsant), BYK358 (manufactured by BYK Chemie Japan KK), and Diaaid (manufactured by Mitsubishi Rayon Co., Ltd.).

The preferred examples of the dispersants include Anti-Terra U, Anti-Terra P and Disperbyk 101 (manufactured by BYK-Chemie Japan KK).

The preferred examples of the anti-foaming agents include BYK-O (manufactured by BYK Chemie Japan KK).

The preferred examples of the ultraviolet ray-absorbing agents include benzotriazol-type ultraviolet ray-absorbing agents such as Tinuvin 900, Tinuvin 384 and Tinuvin P (manufactured by Chiba Geigy) and oxalic anilide-type ultraviolet ray-absorbing agents such as Sanduvor 3206 (manufactured by Sandoz KK).

The preferred examples of the light stabilizers include hindered amine light stabilizers such as Sanol LS292 (manufactured by Sankyo Co., Ltd.) and Sanduvor 3058 (manufactured by Sandoz KK).

The thinners include aromatic compounds such as toluene, xylene and ethylbenzene; alcohols such as methanol, ethanol, propanol, butanol and isobutanol; ketons such as acetone, methylisobutyl ketone, methylamyl ketone, cyclohexanone, isophorone and N-methylpyrrolidone; esters such as ethyl acetate, butyl acetate and methyl cellosolve; and mixtures thereof.

The anti-static agents include Esocard C25 (manufactured by Lion Armor).

The present coating composition is useful for coating compositions, especially for clear coatings, intercoatings, solid color coatings and base coatings. In particular, the coating composition is useful for clear coatings.

In particular, the present resin composition is excellent for clear coatings to be used for two coat-one bake system, three coat-one bake system or over coat system. The present coating composition can be coated on the substrate as an intercoating, base coating and a clear coating in this order. Alternatively, the present coating composition can be coated as a solid color coating and a clear coating. Further, the present coating composition can be used as an intercoating and the conventional base coating of solvent-type or aqueous-type can be coated thereon in the state of wet-on-wet. Also, the present coating composition can be coated as a base coating and then the conventional clear coating can be coated thereon. Further, the conventional base coating can be coated and then the present coating composition can be coated as a clear coating thereon in the state of wet-on-wet. In this case, the base coating is preferably a coating composition comprising an oligomer having a hydroxyl group and a weight average molecular weight of 6000 or lower and melamine resin. Such base coating composition may be of an organic solvent-type and aqueous-type. The base coating composition preferably has a solid content of 35 wt. % or higher, much preferably 40 wt. % or higher.

The present composition has a low viscosity, even though the organic solvent content is small. Accordingly, the solid content of the coating composition can be made much higher than the conventional ones and can keep a suitable viscosity for coating compositions.

It is preferable that the present coating composition be generally coated on a substrate in a prescribed amount, set (dried), and then baked, so as to form a coating on the substrate.

The setting (drying) is made usually at room or ambient temperature for usually 5 to 30 min., preferably 10 to 15 min. The baking is suitably made at 60° to 200° C., preferably 80° to 160° C., for 1 to 60 min., preferably 10 to 40 min.

The present coating composition can be coated by hot spraying, so that the solvent content of the composition can be further reduced. Such hot spray can be made so that temperatures between the storage tank for the composition and the portion just before the hot spray is maintained at a prescribed temperature, usually 30° to 80° C., preferably 35° to 70° C.

The present coating composition provides excellent coating properties such as solvent resistance, scuff resistance, acid resistance and water resistance, as well as improved coating appearance, and reduces the organic solvent content much lower than the conventional ones. For example, the present composition reduces the organic solvent content to 30% or less, preferably 25% or less, much preferably 20% or less. Therefeore, the present composition can much reduce the problem of the environmental pollution caused by the release of organic solvents. In this connection, the lower limit of the organic solvent is preferably 5%.

EXAMPLES

The present invention will be further explained in more detail below with reference to the reference examples and the working examples. In this case, the terms "part" and "%" mean those by weight, if otherwise indicated below.

Synthesis Example 1

Synthesis of Acrylic Oligomers Having a Blocked Carboxyl Group

Into a four-necked flask with a stirrer, an inlet for introducing an inert gas, a thermometer and a cooler, 1200 parts of xylene was introduced and heated at 100° C. Then, a mixture containing 196 parts of trimethylsilyl methacrylate, 50 parts of styrene, 100 parts of 2-ethylhexyl acrylate and 154 parts of n-butyl methacrylate and a mixture containing 300 parts of xylene and 75 parts of t-butyl peroxypivalate were introduced into the flask by dropping them over 7 hours. Then, the reaction was carried out at the same temperature for 5 hours, to produce an acrylic oligomer solution having a non-volatile content of 25%. Then, the solution was dried under vacuum to evaporate xylene, so as to yield an acrylic oligomer (a-1) having a viscosity of 2450 cps at 25° C. The properties of the oligomer (a-1) were listed in Table 1 below.

Synthesis Example 2

Synthesis of Acrylic Oligomers Having a Blocked Carboxyl Group and an Epoxy Group Synthesis Example 1 was repeated except that 1300 parts of xylene was introduced and that a mixture containing 100 parts of styrene, 244 parts of dimethyl t-butylsilyl acrylate, 107 parts of glycidyl acrylate and 49 parts of 2-ethylhexyl acrylate was used, to produce an acrylic oligomer solution having a non-volatile content of 26.8%. Then, the solution was dried under vacuum by evaporating the solvent, so as to yield an acrylic oligomer (a-2) having a viscosity of 2900 cps. The properties of the oligomer (a-2) were listed in Table 1 below.

Synthesis Examples 3–29

Synthesis of Acrylic Oligomers Having Various Combinations of a First and Second Functional Groups According to the feed materials listed in Table 1 below, various acrylic oligomers were prepared in the same manner as Synthesis Example 1. The properties of the resultant oligomers are listed in the table.

In this connection, the indications used in the table mean as follows.

BC group (gr.): Blocked carboxyl group
SI group: Hydrolyzable silyl group
EP group: Epoxy group
AA group: Acid anhydride group
AIBN: Azobisisobutyronitrile
P-V: t-Butyl peroxypivalate

TABLE 1

| | Syn. Ex.1 | Syn. Ex.2 | Syn. Ex.3 | Syn. Ex.4 |
|---|---|---|---|---|
| Oligomers Properties | a-1 | a-2 | a-3 | a-4 |
| Mn | 1050 | 1250 | 1280 | 1090 |
| Mw | 2050 | 2400 | 2505 | 2100 |
| Mw/Mn | 1.95 | 1.92 | 1.96 | 1.93 |
| Tg (°C.) | −5.6 | 30 | 5.0 | 20.4 |
| Functional group | BC | BC | BC | BC |
| | | EP | SI | AA |
| Feed Material: | | | | |
| Trimethylsilyl methacrylate | 196 | | 157 | |
| Dimethtyt-butylsilyl acrylate | | 244 | | 162 |
| Glycidyl methacrylate | | 107 | | |
| Maleic anhydride | | | | 98 |
| Methacryloyloxy propyltrimethoxy-silane | | | 100 | |
| Styrene | 50 | 100 | 50 | 50 |
| Butyl methacrylate | 154 | | 150 | 95 |
| 2-Etylhexyl acrylate | 100 | 49 | 43 | 95 |
| Xylene | 1200 | 1300 | 1200 | 1200 |
| AIBN | | 10 | | 5 |
| P-V | 75 | 80 | 100 | 70 |
| Xylene | 300 | 300 | 300 | 300 |

TABLE 1-continued

| | Syn. Ex.5 | Syn. Ex.6 | Syn. Ex.7 | Syn. Ex.8 |
|---|---|---|---|---|
| Oligomer Properties | a-5 | a-6 | a-7 | a-8 |
| Mn | 1150 | 995 | 1050 | 1250 |
| Mw | 1945 | 1850 | 2010 | 2400 |
| Mw/Mn | 1.69 | 1.86 | 1.91 | 1.92 |
| Tg (°C.) | 18.0 | 8.9 | 32.0 | 32.1 |
| Functional group: | BC | BC | BC | BC |
| | EP | EP | SI | AA |
| | AA | SI | AA | EP |
| | | | | SI |
| Feed Material | | | | |
| 1-Butoxy-1-ethyl methacrylate | 140 | 140 | | 140 |
| Trimethylsilyl methacrylate | | | 156 | 40 |
| Glycidyl methacrylate | 100 | 50 | | 142 |
| Maleic anhydride | | | 49 | 49 |
| Methacryloyloxy propyltrimethoxy-silane | 100 | 100 | 50 | 50 |
| Styrene | 100 | 110 | 100 | 30 |
| n-Butyl methacrylate | | | 145 | 49 |
| n-Butyl acrylate | 60 | 100 | | |
| Xylene | 1250 | 1250 | 1500 | 1200 |
| AIBN | 30 | 30 | | 10 |
| P-V | 50 | 50 | 120 | 55 |
| Xylene | 300 | 300 | 400 | 400 |

| | Syn.Ex.9 | Syn.Ex.10 | Syn.Ex.11 | Syn.Ex.12 |
|---|---|---|---|---|
| Oligomer Properties | b-1 | b-2 | b-3 | b-4 |
| Mn | 1200 | 1320 | 950 | 1050 |
| Mw | 2230 | 2700 | 1700 | 2020 |
| Mw/Mn | 1.86 | 2.05 | 1.79 | 1.92 |
| Tg (°C.) | 4.1 | 24.1 | −10.7 | 21.6 |
| Functional group | EP | AA | SI | EP |
| | | | | SI |
| Feed Material | | | | |
| Glycidyl methacrylate | 142 | | | 210 |
| Maleic anhydride | | 147 | | |
| Methacryloyloxy propyltrimethoxy silane | | | 200 | 100 |
| Styrene | 100 | 120 | 100 | 50 |
| n-Butyl methacrylate | 100 | 100 | 40 | 100 |
| n-Butyl acrylate | 90 | | 60 | |
| 2-Ethylhexyl acrylate | 68 | 133 | 100 | 40 |
| Xylene | 1200 | 1200 | 1100 | 1200 |
| AIBN | 10 | 10 | | 15 |

TABLE 1-continued

| | | | | |
|---|---|---|---|---|
| P-V | 85 | 86 | 65 | 80 |
| Xylene | 350 | 300 | 400 | 30 |

| | Syn.Ex. 13 | Syn.Ex. 14 | Syn.Ex. 15 | Syn.Ex. 16 |
|---|---|---|---|---|
| Oligomer Properties | b-5 | b-6 | b-7 | a-1-1 |
| Mn | 950 | 900 | 970 | 720 |
| Mw | 1800 | 1700 | 1750 | 1408 |
| Mw/Mn | 1.89 | 1.89 | 1.80 | 1.96 |
| Tg (°C.) | 26.3 | 51.0 | 29.7 | 4.4 |
| Functional group | EP AA | AA SI | EP AA SI | BC |
| Feed Material | | | | |
| Dimethylbutyl silyl acrylate | | | | 196 |
| Glycidyl methacrylate | 50 | | 140 | |
| Maleic anhydride | | 150 | 49 | |
| Itaconic anhydride | 150 | | | |
| Methacryloyloxy propyltrimethoxy silane | | 150 | 200 | |
| Styrene | 130 | 130 | 50 | 50 |
| n-Butyl methacrylate | | 170 | 50 | 154 |
| n-Butyl acrylate | 170 | | | |
| 2-Ethylhexyl acrylate | | | 11 | 100 |
| Xylene | 1500 | 1500 | 1200 | 1250 |
| AIBN | | | 5 | 30 |
| P-V | 110 | 110 | 60 | 90 |
| Xylene | 400 | 400 | 300 | 300 |

| | Syn.Ex. 17 | Syn.Ex. 18 | Syn.Ex. 19 | Syn.Ex. 20 |
|---|---|---|---|---|
| Oligomer Properties | a-2-1 | a-3-1 | a-6-1 | a-8-1 |
| Mn | 725 | 710 | 705 | 700 |
| Mw | 1400 | 1380 | 1750 | 1350 |
| Mw/Mn | 1.93 | 1.94 | 2.48 | 1.93 |
| Tg (°C.) | 6.6 | 8.1 | 8.9 | 32.1 |
| Functional group | BC EP | BC SI | BC EP SI | BC EP AA SI |
| Feed Material | | | | |
| Trimethylsilyl methacrylate | | 157 | | 40 |
| Dimethyl-butyl silyl acrylate | 244 | | | |
| 1-Butoxy-1-ethyl methacrylate | | | 140 | 140 |
| Glycisyl methacrylate | | | 50 | 142 |
| Maleic anhydride | | | | 49 |
| Methacryloyloxy propylmethoxysilane | | 100 | 100 | 50 |
| Styrene | 50 | 50 | 110 | 30 |
| n-Butyl methacrylate | 154 | 150 | | 49 |
| n-Butyl acrylate | | | 100 | |
| 2-Ethylhexyl acrylate | 102 | 43 | | |
| Xylene | 1500 | 1100 | 1500 | 1300 |
| AIBN | 20 | 20 | 30 | 20 |
| P-V | 100 | 70 | 90 | 120 |
| Xylene | 400 | 400 | 300 | 300 |

| | Syn.Ex.21 | Syn.Ex.22 | Syn.Ex.23 |
|---|---|---|---|
| Oligomer Properties | b-1-1 | b-3-1 | b-4-1 |
| Mn | 740 | 714 | 740 |
| Mw | 1480 | 1380 | 1370 |
| Mw/Mn | 2.0 | 1.93 | 1.85 |
| Tg (°C.) | 12.2 | −10.7 | 21.6 |
| Functional group | EP | SI | EP SI |
| Feed Material | | | |
| Glycidyl methacrylate | 210 | | 210 |
| Methacryloyloxy propyltrimethoxy silane | | 200 | 100 |
| Styrene | 100 | 100 | 50 |
| n-Butyl methacrylate | 100 | 40 | 100 |
| n-Butyl acrylate | 90 | 60 | |
| 2-Ethylhexyl acrylate | 50 | 100 | 40 |
| Xylene | 1250 | 1500 | 1100 |
| AIBN | 30 | 20 | 20 |
| P-V | 90 | 65 | 115 |
| Xylene | 300 | 400 | 400 |

| | Syn.Ex.24 | Syn.Ex.25 | Syn.Ex.26 |
|---|---|---|---|
| Oligomer Properties | b-7-1 | a-1-2 | a-2-2 |
| Mn | 680 | 1450 | 1475 |
| Mw | 1240 | 2805 | 2900 |
| Mw/Mn | 1.82 | 1.93 | 1.97 |
| Tg (°C.) | 51.7 | −2.0 | 24.5 |
| Functional group | EP AA SI | BC | BC EP |
| Feed Material | | | |
| Trimethylsilyl methacrylate | | 196 | |
| Dimethyl t-butylsily acrylate | | | 244 |
| Glycidyl-methacrylate | | | 107 |
| Maleic anhydride | 150 | | |
| Methacryloyloxy propyltrimethoxy silane | 150 | | 100 |
| Styrene | 130 | 50 | 100 |
| n-Butyl methacrylate | 170 | 154 | |
| 2-Ethylhexyl acrylate | | 100 | 49 |
| Xylene | 1500 | 1300 | 1250 |
| AIBN | | 10 | 30 |
| P-V | 150 | 50 | 35 |
| Xylene | 400 | 300 | 300 |

| | Syn.Ex.27 | Syn.Ex.28 | Syn.Ex.29 |
|---|---|---|---|
| Oligomer Properties | a-8-2 | b-1-2 | b-4-2 |
| Mn | 1765 | 1680 | 1854 |
| Mw | 3460 | 3230 | 3610 |
| Mw/Mn | 1.96 | 1.92 | 1.95 |
| Tg (°C.) | 32.1 | 12.2 | 21.6 |
| Functional group | BC EP SI | EP | EP SI |
| Feed Material | | | |
| 1-Butoxy-1-ethyl methacrylate | 140 | | |
| Trimethylsilyl acrylate | 40 | | |
| Glycidyl methacrylate | 142 | 210 | 210 |
| Maleic anhydride | 49 | | |
| Methacryloyloxy propyltrimethoxy silane | 50 | | 100 |
| Styrene | 30 | 100 | 50 |
| n-Butyl methacrylate | 49 | 100 | 100 |
| n-Butyl acrylate | | 90 | |
| 2-Ethylhexyl acrylate | | 50 | 40 |
| Xylene | 1500 | 1100 | 1500 |

TABLE 1-continued

| AIBN | | | |
|---|---|---|---|
| P-V | 35 | 30 | 38 |
| Xylene | 400 | 400 | 400 |

Synthesis Example 30

Synthesis of Acrylic Oligomers Having Various Combinations of a First and Second Functional Groups Synthesis Example 1 was repeated except that 122 parts of methacrylic acid was used in place of 196 parts of trimethylsilyl methacrylate and that a mixed solvent containing 900 parts of xylene and 300 parts of butylcelosolve was used in place of 1200 parts of xylene, so as to produce acrylic oligomer c-1, which solidified as glass when it was cooled. The acrylic oligomer c-1 has an Mn of 1450, an Mw of 3000, an Mw/Mn ratio of 2.0 and a Tg of 21.8.

Synthesis Example 31

Synthesis of Acrylic Oligomer Having a Blocked Carboxyl Group and Mn of 2500

Synthesis Example 1 was repeated except that the same monomer mixture was used and that 75 parts of t-butyl peroxy-2-ethylhexanoate was changed to 45 parts thereof, so as to produce acrylic oligomer a-9 having an Mn of 2520, an Mw of 5200, an Mw/Mn ratio of 2.1 and a Tg of 21.8. This example produces acrylic oligomer having a blocked carboxyl group but having an Mn more than 2000.

Synthesis Example 32

Synthesis of Acrylic Oligomer Having a Blocked Carboxyl Group and Mn of 400

Synthesis Example 1 was repeated except that the same monomer mixture was used and that 75 parts of t-butylperoxy-2-ethylhexanoate was changed to 150 parts thereof, so as to produce acrylic oligomer a-10 having an Mn of 420, an Mw of 810, an Mw/Mn ratio of 1.9 and a Tg of 18.5. This example produces acrylic oligomer having a blocked carboxyl group but having an Mn less than 600.

Synthesis Example 33

Synthesis of Acrylic Oligomer Having no Blocked Carboxyl Group and an Mn of 2500

Synthesis Example 12 was repeated except that the same monomer mixture was used and that 65 parts of t-butylperoxy-2-ethylhexanoate was changed to 40 parts thereof, so as to produce acrylic oligomer b-8 having an Mn of 2570, an Mw of 5200, an Mw/Mn ratio of 2.0 and a Tg of 21.6. This example produces acrylic oligomer having no blocked carboxyl group but having an Mn more than 2000.

Synthesis Example 34

Synthesis of Acrylic Oligomer Having no Blocked Carboxyl Group and an Mn of 400

Synthesis Example 12 was repeated except that the same monomer mixture was used and that 65 parts of t-butylperoxy-2-ethylhexanoate was changed to 170 parts thereof, so as to produce acrylic oligomer b-9 having an Mn of 470, an Mw of 910, an Mw/Mn ratio of 1.9 and a Tg of 17.0. This example produces acrylic oligomer having no blocked carboxyl group but having an Mn less than 600.

EXAMPLES 1–20 and Comparative Examples 1–5

1. Preparation of Clear Coating Composition

The clear resin compositions for clear coating compositions were prepared according to the formulations as listed in Table 2 shown below. Then, the resultant resin compositins were diluted with methy amyl ketone so that the coating compositions had a Ford cup No. 4 viscosity of 40 seconds at the prescribed coating temperature (see Table 3 below), to prepare clear coating compositions.

2. Substrate to be Coated

A substrate to be coated with the resultant coating compositions is prepared by coating on zinc phosphate treated steel, a commercially available electro-deposition coating composition and intercoating composition so that the thickness each of such coating composition after dryness was 35 µm, and then baking them. The resultant substrate was then coated with the following base coating composition.

Solvent-type Coating Composition (I):

This base coating composition (I) was a so-called "metallic base coating composition" as prepared by combining Acrydic 47-712 (hydroxyl group containing acrylic resin, manufactured by Dainippon Ink & Chemicals, Inc.), Superbeckamine L-117-60, Alumi paste 7160NS (aluminum paste manufactured by Toyo Aluminium K.K.) and Fastgen Super Red BN (manufactured by Dainippon Ink & Chemicals, Inc.). In this connection, the pigment weight concentration (PWC) of metal aluminum was 13% and the PWC of the red pigment was 15%.

The base coating composition was then diluted with a mixed solvent of toluene/n-butyl acetate/xylene (40/30/30 in respect of the weight ratio) so that the coating composition had a Ford cup No. 4 viscosity of 15 seconds and was coated at a thickness of 17 µm on the dry basis.

5 min. after the coating, the clear coating composition was coated thereon at a thickness of 40 µm on the dry basis at a coating temperature.

The resultant coating was set for 10 min. and then baked at 140° C. for 30 min.

Aqueous-type Coating Composition (II):

The base coating composition (II) was a so-called "metallic base coating composition" as prepared by combining hydroxyl group containing vinyl copolymer emulsion having a non-volatile content of 40%, which had been conventionally prepared and had the composition of styrene/methyl methacrylate/n-butyl acrylate/methacrylic acid/2-hydroxypropyl methacrylate (10:35:48:2:5 in respect of weight ratio), Cymel C-325 (methyletherified melamine resin manufactured by Mitsui Cyanamid), Primal ASE-60 and Alumi Paste WZ7160 (aluminum paste manufactured by Toyo Aluminium K.K.).

The resultant base coating composition was diluted with water/isopropyl alcohol (mixing ratio of 80/20) so that the coating composition had a Ford cup No. 4 viscosity of 15 seconds, coated at a thickness of 17 µm on the dry basis, and heated at 80° C. for 5 min. so as to remove water content therefrom. Thereafter, the clear coating composition was coated thereon so that the thickness of the resultant coating was 40 µm.

The resultant coating was set for 10 min. and baked at 140° C. for 30 min.

TABLE 2

|  | Ex.1 | Ex.2 | Ex.3 | Ex.4 |
|---|---|---|---|---|
| Coating Composition | CR-1 | CR-2 | CR-3 | CR-4 |
| Oligomers |  |  |  |  |
| (a-1) | 1000 | 1000 |  | 1190 |
| (a-2) |  |  | 1000 |  |
| (a-3) |  |  |  |  |
| (b-1) | 1050 |  |  |  |
| (b-3) |  |  | 500 |  |
| (b-4) |  |  |  | 1000 |
| Monoisopropyl phosphate | 40 |  |  |  |
| p-Toluene sulfonic acid |  | 30 |  |  |
| Dodecylbenzene sufonic acid |  |  | 30 | 30 |

|  | Ex.5 | Ex.6 | Ex.7 | Ex.8 |
|---|---|---|---|---|
| Coating Composition | CR-5 | CR-6 | CR-7 | CR-8 |
| Oligomer |  |  |  |  |
| (a-4) | 1000 |  |  |  |
| (a-5) |  | 1000 |  |  |
| (a-6) |  |  | 1000 |  |
| (a-7) |  |  |  | 1000 |
| (b-1) | 1000 |  |  |  |
| (b-2) |  |  | 165 |  |
| (b-4) |  |  |  | 1000 |
| Monoisopropyl phosphate |  |  | 23 |  |
| p-Toluene sulfonic acid |  | 20 |  | 40 |
| Dodecybenzene sulfonic acid | 30 |  |  |  |

|  | Ex.9 | Ex.10 | Ex.11 | Ex.12 |
|---|---|---|---|---|
| Coating Composition | CR-9 | CR-10 | CR-11 | CR-12 |
| Oligomer |  |  |  |  |
| (a-1) |  |  | 350 |  |
| (a-2) |  |  |  |  |
| (a-4) |  | 1000 |  | 1000 |
| (a-8) | 1000 |  |  |  |
| (b-1) |  |  |  | 1000 |
| (b-3) |  |  | 200 |  |
| (b-4) | 300 |  |  |  |
| (b-5) |  |  | 1000 |  |
| (b-6) |  |  |  | 550 |
| (b-7) |  | 660 |  |  |
| Monoisopropyl phosphate | 19.5 |  |  |  |
| p-Toluene sulfonic acid |  | 32 |  |  |
| Dodecylbenzene sulfonic acid |  |  | 31 | 51 |

|  | Ex.13 | Ex.14 | Ex.15 | Ex.16 |
|---|---|---|---|---|
| Coating Composition | CR-13 | CR-14 | CR-15 | CR-16 |
| Oligomer |  |  |  |  |
| (a-1-1) | 1000 |  | 1190 |  |
| (a-2-1) |  | 1000 |  |  |
| (a-8-1) |  |  |  | 1000 |
| (b-1-1) | 1050 |  |  |  |
| (b-3-1) |  |  |  |  |
| (b-4-1) |  |  | 1000 | 3000 |
| Monoisopropyl phosphate | 40 |  |  | 19.5 |
| Dodecybenzene sulfonic acid |  | 30 | 30 |  |

|  | Ex.17 | Ex.18 | Ex.19 |
|---|---|---|---|
| Coating Composition | CR-17 | CR-17 | CR-19 |
| Oligomer |  |  |  |
| (a-1-2) | 1000 |  |  |
| (a-2-2) |  | 1000 |  |
| (a-8-2) |  |  | 1000 |
| (b-1-2) | 1050 |  |  |
| (b-4-2) |  |  | 300 |
| Monoisopropyl phosphate | 40 |  |  |
| Dodecylbenzene sulfonic acid |  | 30 | 19.5 |

TABLE 2-continued

|  | Com. Ex.1 | Com. Ex.2 | Com. Ex.3 |
|---|---|---|---|
| Coating Composition | CR-20 | CR-21 | CR-22 |
| Oligomer |  |  |  |
| (a-1) | 1190 |  |  |
| (a-9) |  | 1190 |  |
| (a-10) |  |  | 1190 |
| (b-4) | 1000 |  |  |
| (b-8) |  | 1000 |  |
| (b-9) |  |  | 1000 |
| Dodecylbenzene sulfonic acid |  | 30 | 30 |

|  | Com. Ex.4 | Com. Ex.5 |
|---|---|---|
| Coating Composition | CR-23 | CR-24 |
| Oligomer |  |  |
| (a-1) | 1190 |  |
| (a-9) |  |  |
| (a-10) |  | 1190 |
| (b-4) |  | 1000 |
| (b-8) | 1000 |  |
| (b-9) |  |  |
| Dodecylbenzene sulfonic acid | 30 | 30 |

To the above coating composition, the following ultraviolet ray-absorber and light stabilizer were added respectively in amounts of 1.5% and 1.0%, based on the solid content of the composition.

Tinuvin-900: Ultraviolet ray-absorber manufactured by Swiss company, Chiba Geigy.

Sanol LS-123: Light stabilizer manufactured by Swiss company, Chiba Geigy.

As a tin catalyst, dibutyltin dilaurate was used.

Application Examples 1–20 and Application Controls 1–5

The clear coating compositions of the examples and comparative examples and the above base coating compositions (I) and (II) were coated on the substrate in the ratios as stated in Table 3 below. The properties of the resultant coatings were evaluated. The results are shown in Table 3 below. In this case, the evaluation testes as employed are as follows.

(1) Solvent Content (%) at 25° C.:

The solvent content of the coating composition is determined in respect of a limit viscosity wherein the coating composition can be hot-sprayed.

(2) Gross:

This property is determined in respect of 60° mirror reflectance (%).

(3) Pencil Hardness:

This property is determined in respect of the hardness of the pencil where the coating begins to get scratch with Mitsubishi Uni (manufactured by Mitsubishi Pencil K.K.).

(4) Impact Strength:

This property is determined by Dupont impact tester (with ½ inch notch and a load of 500 g).

(5) Acid Resistance:

This property is determined by dropping 0.2 ml of a 5% $H_2SO_4$ aqueous solution on the coating, drying the coating at 80° C. for 30 min., and then observing the coating condition.

(6) Alkali Resistance:

This property is determined by dropping 0.2 ml of a 5% NaOH aqueous solution on the coating, drying the coating at 80° C. for 30 min., and then observing the coating condition.

(7) Scuff Resistance:

A felt is caused to absorb a cleanser in an amount of 5%. The coating is rubbed so that the felt is subjected to 30 times of reciprocating movements on the coating with a weight of 1 kg imposed on the felt. The evaluation is made by determining the gloss maintaining proportions of the coatings.

(8) Solvent Resistance:

The coating is rubbed, in accordance with xylene rubbing test, with a felt wherein xylene is adsorbed, so that the felt is subjected to 10 times of reciprocating movements.

(9) Weathering Resistance:

The coating is subjected to accelerated weathering tester for 3000 hrs. The evaluation is made by determining the gloss maintaining proportions of the coatings.

TABLE 3

|  | Ap.Ex*.1 | Ap.Ex.2 | Ap.Ex.3 | Ap.Ex.4 |
|---|---|---|---|---|
| Base coating used | I | II | II | II |
| Clear coating used | CR-1 | CR-2 | CR-3 | CR-4 |
| Coating Temp. (°C.) | 40 | 40 | 60 | 60 |
| Solvent Con. (%) | 20 | 18 | 13 | 15 |
| Solvent Con. at 25° C. | 24 | 22 | 26 | 28 |
| Gross | 91 | 92 | 89 | 90 |
| Pencil hardness | F | H | H | H |
| Impact res. | 50< | 30 | 40 | 40 |
| Solvent res. | Good | Good | Good | Good |
| Acid res. | No** | No | No | No |
| Alkali res. | No** | No | No | No |
| Scuff res.(%) | 88 | 90 | 91 | 92 |
| Weathering res. | 89 | 91 | 90 | 92 |

Note:
*"Ap. Ex." means Application Example.
**"No" means that there is no scar on the coating.

|  | Ap.Ex.5 | Ap.Ex.6 | Ap.Ex.7 | Ap.Ex.8 |
|---|---|---|---|---|
| Base coating used | I | II | II | II |
| Clear coating used | CR-5 | CR-6 | CR-7 | CR-8 |
| Coating Temp. (°C.) | 25 | 25 | 25 | 25 |
| Solvent Con. (%) | 25 | 27 | 25 | 26 |
| Solvent Con. at 25° C. | 25 | 27 | 25 | 26 |
| Gross | 88 | 87 | 90 | 91 |
| Pencil hardness | 2H | H | H | H |
| Impact res. | 30 | 40 | 30 | 40 |
| Solvent res. | Good | Good | Good | Good |
| Acid res. | No | No | No | No |
| Alkali res. | No | No | No | No |
| Scuff res.(%) | 92 | 90 | 89 | 93 |
| Weathering res. | 89 | 91 | 92 | 88 |

|  | Ap.Ex.9 | Ap.Ex.10 | Ap.Ex.11 | Ap.Ex.12 |
|---|---|---|---|---|
| Base coating used | II | II | II | II |
| Clear coating used | CR-9 | CR-10 | CR-11 | CR-12 |
| Coating Temp. (°C.) | 60 | 60 | 60 | 60 |
| Solvent Con. (%) | 16 | 14 | 12 | 14 |
| Solvent Con. at 25° C. | 25 | 23 | 21 | 23 |
| Gross | 89.2 | 90.4 | 91.5 | 92.0 |
| Pencil hardness | 2H | H | H | H |
| Impact res. | 40 | 30 | 40 | 40 |
| Solvent res. | Good | Good | Good | Good |
| Acid res. | No | No | No | No |
| Alkali res. | No | No | No | No |
| Scuff res.(%) | 89.8 | 89.4 | 92.2 | 93.2 |
| Weathering res. | 90.1 | 91.2 | 94.2 | 93.4 |

|  | Ap.Ex.13 | Ap.Ex.14 | Ap.Ex.15 | Ap.Ex.16 |
|---|---|---|---|---|
| Base coating used | II | II | I | I |
| Clear coating used | CR-13 | CR-14 | CR-15 | CR-16 |
| Coating Temp. (°C.) | 60 | 60 | 60 | 60 |
| Solvent: Con. (%) | 6 | 7 | 8 | 8 |
| Solvent Con. at 25° C. | 15 | 16 | 17 | 18 |
| Gross | 92.0 | 93.2 | 91.8 | 92.4 |
| Pencil hardness | F | F | F | F |
| Impact res. | 40 | 40 | 40 | 40 |
| Solvent res. | Good | Good | Good | Good |
| Acid res. | Good | Good | Good | Good |
| Alkali res. | Good | Good | Good | Good |

TABLE 3-continued

| Scuff res. (%) | 83.1 | 83.8 | 82.4 | 84.2 |
|---|---|---|---|---|
| Weathering res. | 84.2 | 85.8 | 86.2 | 84.9 |

|  | Ap.Ex.17 | Ap.Ex.18 | Ap.Ex.19 |
|---|---|---|---|
| Base coating used | II | II | II |
| Clear coating used | CR-17 | CR-18 | CR-19 |
| Coating Temp. (°C.) | 25 | 25 | 25 |
| Solvent Con. (%) | 28 | 28 | 28 |
| Solvent Con. at 25° C. | 28 | 28 | 28 |
| Gross | 92.1 | 91.2 | 90.4 |
| Pencil hardness | 2H | 2H | 2H |
| Impact res. | 40 | 40 | 40 |
| Solvent res. | Good | Good | Good |
| Acid res. | No | No | No |
| Alkali res. | No | No | No |
| Scuff res. (%) | 94.2 | 93.8 | 95.2 |
| Weathering res. | 89.2 | 91.2 | 92.8 |

|  | Com.Ex.*1 | Com.Ex.2 | Com.Ex.3 |
|---|---|---|---|
| Base coating used | II | II | II |
| Clear coating used | CR-20 | CR-21 | CR-22 |
| Coating Temp. (°C.) | 25 | 25 | 25 |
| Solvent Con. (%) | 45 | 41 | 20 |
| Solvent Con. at 25° C. | 45 | 41 | 20 |
| Gross | 82.2 | 91.2 | 98.2 |
| Pencil hardness | H | H | 4B |
| Impact res. | 30 | 40 | 20 |
| Solvent res. | Good | Good | Good |
| Acid res. | No | No | Etched |
| Alkali res. | No | No | Etched |
| Scuff res. (%) | 88.0 | 93.2 | 48.2 |
| Weathering res. | 91.0 | 91.8 | 62.2 |

Note: *"Com.Ex." means Comparative Example.

|  | Com.Ex.4 | Com.Ex.5 |
|---|---|---|
| Base coating used | II | II |
| Clear coating used | CR-23 | CR-24 |
| Coating Temp. (°C.) | 25 | 25 |
| Solvent Con. (%) | 38 | 15 |
| Solvent con. at 25° C. | 38 | 15 |
| Gross | 91 | 95 |
| Pencil hardness | H | 4B |
| Impact res. | 40 | 20 |
| Solvent res. | Good | Semi-solved |
| Acid res. | Good | Etched |
| Scuff res. (%) | 89 | 32 |
| Weathering res. | 91.8 | 52 |

As shown from the above date, the use of the present low solvent content-type coating composition provides the resultant coating excellent in various properties, in particular, coating strength, acid resistance, scuff resistance, alkali resistance, solvent resistance and the like as well as low solvent content, as compared with the coating compositions containing acrylic oligomers having unblocked carboxyl groups or having no molecular weight as specified in the present invention.

What is claimed is:

1. A resin composition containing an organic solvent in an amount of 0 to 30% at 25° C., comprising a vinyl oligomer or a mixture of vinyl oligomers, said vinyl oligomer or mixture of vinyl oligomers having, as essential functional groups, a first functional group of a blocked carboxyl group and a second functional group selected from the group consisting of an epoxy group, a silanol group, a hydrolyzable silyl group and an acid anhydride group, and having a number average molecular weight (Mn) of 600 to 2,000, a weight average molecular weight (Mw) of 600 to 5,000, and a ratio of a weight average molecular weight/a number average molecular weight (Mw/Mn) of 1.0 to 2.5, and wherein said first and second functional groups may be present in the same or different vinyl oligomers.

2. The resin composition of claim 1 wherein said blocked carboxyl group is represented by the formula (1):

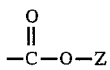  (1)

wherein Z means the following group represented by the formula (2) or (3):

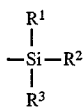  (2)

wherein $R^1$–$R^3$ are independently an alkyl or aryl group, or

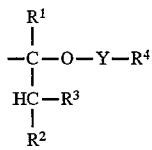  (3)

wherein $R^1$, $R^2$ and $R^3$ are independently a hydrogen atom or a hydrocarbon group having 1–18 carbon atoms, $R^4$ is a hydrocarbon group having 1–18 carbon atoms, $R^3$ and $R^4$ may be combined to form a heterocyclic ring containing Y as a heteroatom, and Y is an oxygen atom or a sulfur atom.

3. The resin composition of claim 1 wherein said silanol group is represented by the formula (4):

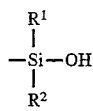  (4)

wherein $R^1$ and $R^2$ may be the same as or different from each other and are a hydroxyl group, an alkyl group, an alkoxy group, —$NR^1R^2$ group wherein $R^1$ and $R^2$ are an alkyl group or an aryl group, —$NR^1COR^2$ wherein $R^1$ and $R^2$ are an alkyl group or an aryl group, —$COR^1$ group wherein $R^1$ is an alkyl group or an aryl group, —$OCOR^1$ group wherein $R^1$ is an alkyl group or an aryl group, an aryl group, —$ONR^1R^2$ group wherein $R^1$ and $R^2$ are an alkyl group or an aryl group, or —$ONCR^1R^2$ group wherein $R^1$ and $R^2$ are an alkyl group or an aryl group, and said hydrolyzable silyl group is represented by the formula (5):

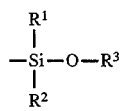  (5)

wherein $R^1$ and $R^2$ are the same as those of the formula (4) and $R^3$ is an alkyl group, —$NR^1R^2$ group wherein $R^1$ and $R^2$ are an alkyl group or an aryl group, —$COR^1$ group wherein $R^1$ is an alkyl group or an aryl group, an aryl group, and —$NCR^1R^2$ group wherein $R^1$ and $R^2$ are an alkyl group or an aryl group.

4. The resin composition of claim 1 wherein the Mn of said vinyl oligomer is 600 to 1900.

5. The resin composition of claim 4 wherein the Mn of said vinyl oligomer is 600 to 1800.

6. The resin composition of claim 1 wherein the Mw/Mn ratio of said vinyl oligomer is 1.0 to 1.8.

7. The resin composition of claim 6 wherein the Mw/Mn ratio of said vinyl oligomer is 1.0 to 1.6.

8. A resin composition containing an organic solvent in an amount of 0 to 30% at 25° C., comprising:

(1) a vinyl oligomer or a mixture of vinyl oligomers, said vinyl oligomer or mixture of vinyl oligomers having, as essential functional groups, a first functional group of a blocked carboxyl group and a second functional group selected from the group consisting of an epoxy group, a silanol group, a hydrolyzable silyl group and an acid anhydride group, and having a number average molecular weight (Mn) of 600 to 2000, a weight average molecular weight (Mw) of 600 to 5000, and a ratio of a weight average molecular weight/a number average molecular weight (Mw/Mn) of 1.0 to 2.5, and wherein said first and second functional groups may be present in the same or different vinyl oligomers; and (2) an acidic curing catalyst.

9. The coating composition of claim 8 wherein said blocked carboxyl group is represented by the formula (1):

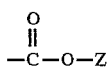  (1)

wherein Z means the following group represented by the formula (2) or (3):

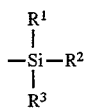  (2)

wherein $R^1$–$R^3$ are independently an alkyl or aryl group, or

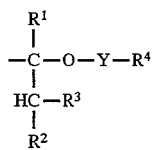  (3)

wherein $R^1$, $R^2$ and $R^3$ are independently a hydrogen atom or a hydrocarbon group having 1–18 carbon atoms, $R^4$ is a hydrocarbon group having 1–18 carbon atoms, $R^3$ and $R^4$ may be combined to form a heterocyclic ring containing Y as a heteroatom, and Y is an oxygen atom or a sulfur atom.

10. The resin composition of claim 8 wherein said silanol group is represented by the formula (4):

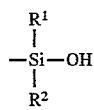  (4)

wherein $R^1$ and $R^2$ may be the same as or different from each other and are a hydroxyl group, an alkyl group, an alkoxy group, —$NR^1R^2$ group wherein $R^1$ and $R^2$ are an alkyl group or an aryl group, —$NR^1COR^2$ wherein $R^1$ and $R^2$ are an alkyl group or an aryl group, —$COR^1$ group wherein $R^1$ is an alkyl group or an aryl group, —$OCOR^1$ group wherein $R^1$ is an alkyl group or an aryl group, an aryl group, —$ONR^1R^2$ group wherein $R^1$ and $R^2$ are an alkyl group or an aryl group, or —$ONCR^1R^2$ group wherein $R^1$ and $R^2$ are an alkyl group or an aryl group, and said hydrolyzable silyl group is represented by the formula (5):

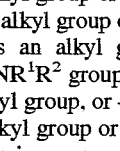  (5)

wherein $R^1$ and $R^2$ are the same as those of the formula (4) and $R^3$ is an alkyl group, —$NR^1R^2$ group wherein $R^1$ and $R^2$ are an alkyl group or an aryl group, —$COR^1$ group wherein $R^1$ is an alkyl group or an aryl group, an aryl group, and —$NCR^1R^2$ group wherein $R^1$ and $R^2$ are an alkyl group or an aryl group.

11. The coating composition of claim 8 wherein the Mn of said vinyl oligomer is 600 to 1900.

12. The coating composition of claim 11 wherein the Mn of said vinyl oligomer is 600 to 1800.

13. The coating composition of claim 8 wherein the Mw/Mn ratio of said vinyl oligomer is 1.0 to 1.8.

14. The coating composition of claim 13 wherein the Mw/Mn ratio of said vinyl oligomer is 1.0 to 1.6.

15. The coating composition of claim 13 wherein a blocked carboxyl group is contained in an amount of 1 to 5 moles/kg-resin per one molecule of the vinyl oligomer.

16. The coating composition of claim 13 wherein a blocked carboxyl group is contained in an amount of 2 to 4 moles/kg-resin per one molecule of the vinyl oligomer.

17. A process for coating the coating composition of claim 8 on the surface of a substrate and then curing it by heat, whereby forming the coating on the surface.

18. The process of claim 17, wherein the heating is carried out at 60° to 200° C.

19. The process of claim 18, wherein the heating is carried out at 80° to 160° C.

20. A process for coating the coating composition of the coating composition of claim 8 on the surface of a substrate at 30° to 80° C.

* * * * *

UNITED STATES PATENT AND TRADEMARK OFFICE
CERTIFICATE OF CORRECTION

PATENT NO. : 5,650,475
DATED : Jul. 22, 1997
INVENTOR(S) : Yoshiaki Marutani, et al It is certified that error appears in the above-identified patent and that said Letters Patent is hereby corrected as shown below:

```
Title page, item [73], add the following:
--and Dainippon Ink And Chemicals, Incorporated Tokyo, Japan--
```

Signed and Sealed this

Ninth Day of March, 1999

Attest:

Q. TODD DICKINSON

*Attesting Officer*   Acting Commissioner of Patents and Trademarks